(12) United States Patent
Shi et al.

(10) Patent No.: US 8,422,841 B1
(45) Date of Patent: Apr. 16, 2013

(54) DOUBLE OPTICAL GRATING

(75) Inventors: Zhong Shi, Fremont, CA (US);
Hongxing Yuan, Fremont, CA (US);
Shing Lee, Fremont, CA (US);
Zhongyan Wang, San Ramon, CA (US);
Jinshan Li, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 372 days.

(21) Appl. No.: 12/779,160

(22) Filed: May 13, 2010

(51) Int. Cl.
*G02B 6/34* (2006.01)

(52) U.S. Cl.
USPC ............................................................ 385/37

(58) Field of Classification Search ............... 359/569, 359/576
See application file for complete search history.

(56) References Cited

U.S. PATENT DOCUMENTS

| | | | |
|---|---|---|---|
| 4,743,083 A | 5/1988 | Schimpe | |
| 4,930,132 A | 5/1990 | Shimizu et al. | |
| 4,991,919 A | 2/1991 | Nishiwaki et al. | |
| 5,031,993 A | 7/1991 | Asthana et al. | |
| 5,204,516 A | 4/1993 | Opheij | |
| 5,631,885 A * | 5/1997 | Brazas, Jr. | 369/44.23 |
| 6,748,138 B2 | 6/2004 | Wang et al. | |
| 6,876,792 B2 | 4/2005 | Kurihara et al. | |
| 7,046,892 B2 | 5/2006 | Yoshikawa et al. | |
| 7,194,164 B2 | 3/2007 | Iazikov et al. | |
| 7,218,817 B2 | 5/2007 | Magnusson et al. | |
| 7,233,563 B2 * | 6/2007 | Ueki et al. | 369/112.03 |
| 7,292,753 B2 | 11/2007 | Cohen et al. | |
| 7,639,911 B2 | 12/2009 | Lee et al. | |
| 8,200,054 B1 * | 6/2012 | Li et al. | 385/37 |
| 8,320,722 B1 | 11/2012 | Yuan et al. | |
| 2002/0176463 A1 | 11/2002 | Bullington et al. | |
| 2003/0077039 A1 | 4/2003 | Kurihara et al. | |

OTHER PUBLICATIONS

Dirk Taillaert, et al., "Grating Couplers for Coupling between Optical Fibers and Nanophotonic Waveguides", Japanese Journal of Applied Physics, vol. 45, No. 8A, 2006, pp. 6071-6077.

Lawrence C. West, et al., "Non Uniform Grating Couplers for Coupling of Gaussian Beams to Compact Waveguides", Reprint of the final paper published in the Integrated Photonics Research Technical Digest, Optical Society of America, 1994, 4 pages. Downloaded from http://www.wai.com/software_pdf/emflex-94OSA_nonUniform.pdf, on Apr. 12, 2010.

Sakoolkan Boonruang, et al., "Novel design to increase the angular tolerance of grating resonance devices at oblique incidence", Optical Society of America, 2007, 2 pages. Downloaded from http://ultralaser.iphy.ac.cn/cleo/data/papers/CThP1.pdf, on Apr. 12, 2010.

Stijn Scheerlinck, et al., "Efficient, broadband and compact metal grating couplers for silicon-on-insulator waveguides," Optics Express, vol. 15, No. 15, Jul. 23, 2007, pp. 9625-9630.

\* cited by examiner

*Primary Examiner* — Omar Rojas (57) ABSTRACT

A method and system for providing an optical grating are described. The optical grating is configured for light of a wavelength. The optical grating includes a top cladding, a first plurality of discrete ridges forming a first grating, a core, a second plurality of discrete ridges forming a second grating, and a bottom cladding. The first plurality of discrete ridges are spaced apart by a first pitch. The second plurality of discrete ridges are spaced apart by a second pitch. The core has a top side adjacent to at least a portion of the top cladding and a bottom side. The bottom cladding is adjacent to at least a portion of the bottom side of the core. The second grating resides between the bottom cladding and the core.

23 Claims, 7 Drawing Sheets

DOUBLE OPTICAL GRATING

BACKGROUND

Optical gratings are used for light coupling and delivery in a variety of optical systems. For example, in energy assisted magnetic recording (EAMR) electromagnetic radiation (light) is provided from a laser to a conventional grating. Typically, the light provided from the laser is in the optical range of the spectrum. The conventional grating is configured for a particular wavelength in the spectrum. Typically this means that the conventional grating actually functions in a range of wavelengths around the particular wavelength. The conventional grating couples light of the particular wavelength from the laser to a waveguide. The light from the waveguide is typically provided to a near-field transducer (NFT) and used to heat a spot on a magnetic recording media. Data is magnetically written to the spot while the spot is heated.

Figure 1:
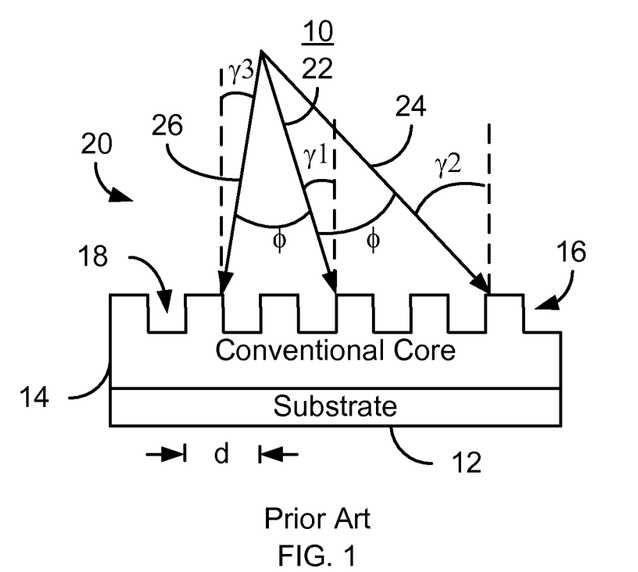
FIG. 1 is a diagram depicting a conventional grating.

FIG. 1 depicts such a conventional grating 10 formed on a substrate 12. The conventional grating 10 may be used in magnetic recording applications. The conventional grating 10 includes a conventional optical core 14. Further, top and bottom cladding may also be included. However, such layers are not depicted for simplicity. The conventional core includes ridges 16 interspersed with troughs 18 and spaced apart a pitch, d. The conventional grating 10 is configured for use with light 20 having a wavelength, $\lambda$. The light 20 is a beam represented by rays 22, 24, and 26. The light 20 is generated by a laser and travels to the conventional grating 10. Central ray 22 corresponds to the general direction in which the light 20 travels. However, the light 20 from the laser is also characterized by a divergence represented by angle $\phi$. Thus, the rays 24 and 26 diverge from the central ray 22 by the angle $\phi$. The conventional grating 10 couples the light 20 into a waveguide (not shown), which redirect the light 20 for use in writing data to a media (not shown).

Figure 2:
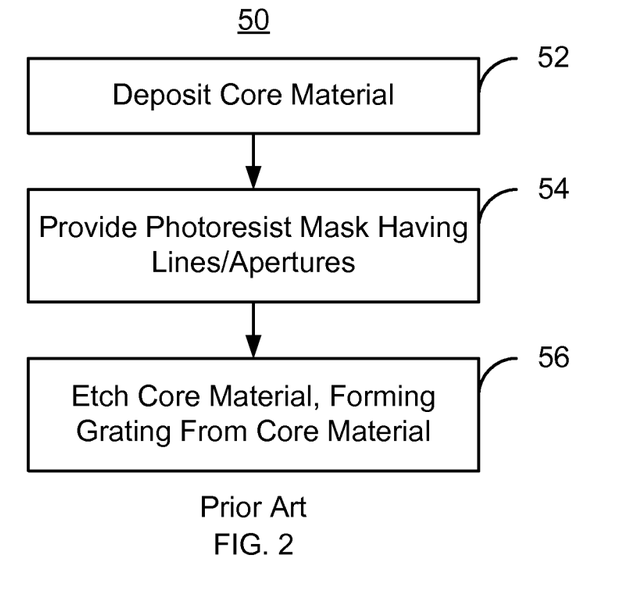
FIG. 2 is a flow chart depicting a conventional method for fabricating an optical grating.

FIG. 2 depicts a conventional method 50 for fabricating a conventional grating such as the conventional grating 10. The core materials, such as $Ta_2O_5$ are deposited, via step 52. A photoresist mask is provided on the core material, via step 54. The photoresist mask has a series of lines interleaved with apertures. The core material is etched, via step 56. Thus, the pattern of the photoresist mask is transferred to the core material. The conventional core 14 may thus be fabricated.

Although the conventional grating 10 and method 50 function, improvements are desired. The coupling efficiency of a grating is a measure of the losses in optical energy between light input to the grating and light output by the grating. A higher coupling efficiency translates to lower losses in a grating. Thus, a higher coupling efficiency is desired. In order to achieve high coupling efficiency in a grating, the geometry of the grating, such as the pitch, depth, and shape of ridges and troughs in a grating are closely controlled. In the conventional grating 10, the pitch, d is generally set to optimize coupling efficiency for the wavelength, $\lambda$, and the principal angle of incidence $\gamma 1$. However, because of the divergence, the rays 22, 24, and 26 are incident upon the grating 10 at different angles. For example, central ray 22 has an angle of incidence with the core 14 of $\gamma 1$. The ray 24 has an angle of incidence with the core 14 of $\gamma 2$. The ray 26 has an angle of incidence with the core 14 of $\gamma 3$. As shown in FIG. 1, $\gamma 1$, $\gamma 2$, and $\gamma 3$ may differ. Similarly, portions of the light 20 between the rays 24 and 26 have varying angles of incidence. As a result, different portions of the light 20 are coupled into the conventional grating 10 with varying efficiency. The optical efficiency of the conventional grating 10 may, therefore, degrade.

BRIEF SUMMARY OF THE INVENTION

A method and system for providing an optical grating are described. The optical grating is configured for light of a wavelength. The optical grating includes a top cladding, a first plurality of discrete ridges forming a first grating, a core, a second plurality of discrete ridges forming a second grating, and a bottom cladding. The first plurality of discrete ridges are spaced apart by a first pitch. The second plurality of discrete ridges are spaced apart by a second pitch. The core has a top side adjacent to at least a portion of the top cladding and a bottom side. The bottom cladding is adjacent to at least a portion of the bottom side of the core. The second grating resides between the bottom cladding and the core.

DETAILED DESCRIPTION OF THE EMBODIMENTS OF THE INVENTION

Figure 3:
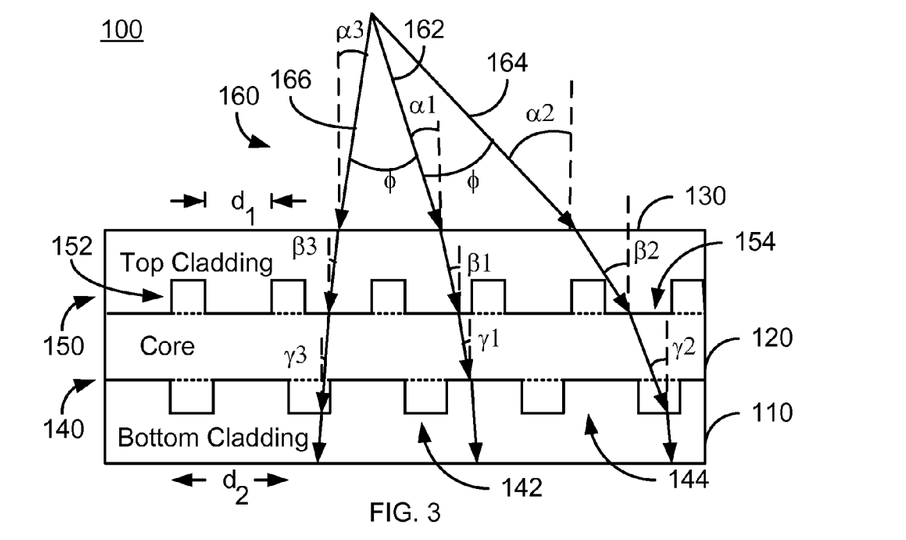
FIG. 3 is a diagram depicting an exemplary embodiment of a double optical grating.

FIG. 3 is a diagram depicting an exemplary embodiment of a double optical grating 100. FIG. 3 is not to scale. The optical grating 100 may be used in an EAMR head. For example, the optical grating 100 may be incorporated into the optics of an EAMR write transducer. However, in other embodiments, the optical grating 100 may be used in another application. In principal, the optical grating 100 may be configured for use with light of a particular wavelength. However, the optical grating 100 is generally used with light in a range around the particular wavelength.

The optical grating 100 includes a bottom cladding layer 110, a core 120, a top cladding layer 130, a bottom grating 140 and a top grating 150. Because two gratings 140 and 150 are included, the optical grating 100 is termed a double grating. The bottom grating 140 includes a plurality of ridges 142 separated by troughs 144. Similarly, the top grating 150 includes a plurality of ridges 152 separated by troughs 154. In some embodiments, at least one of the gratings 150 and 140 is formed by the interfaces between the top cladding 130 and the core 120 and between the bottom cladding 110 and the core 120. In some embodiments, at least one of the gratings 140 and 150 may be formed by a series of nonmagnetic metal lines, or bars. Thus, the ridges 142 and 152 are shown has having dotted lines to indicated that they might include metal bars or simply a depression in one of the layers 110, 120, or 130. The ridges 142 are separated by a pitch, $d_2$, while the ridges 152 are separated by a pitch $d_1$. Thus, the grating 150 may be considered to have a first pitch, while the grating 140 has a second pitch. In the embodiment shown, the pitches of the gratings 140 and 150 differ. Although the pitches of the gratings 140 and 150 are shown as constant, in other embodiments, the pitches of the gratings 140 and 150 may vary. Thus, one or both of the gratings 140 and 150 may have a nonlinear pitch. Further, each of the ridges 142 and 152 are shown as having a different width. In other embodiments, the ridges 142 and 152 may have the same width.

The cladding 110 and 130 and the core 120 are desired to transmit light 160. However, the indices of refraction of the cladding layers 110 and 130 differ from the index of refraction of the core 120. Further, in some embodiments, the index of refraction of the bottom cladding 110 is the same as the top cladding 130. In such embodiments, the bottom cladding 110 and top cladding 130 may be composed of the same material, such as $Al_2O_3$. However, in other embodiments, the bottom cladding 110 and top cladding 130 may include different materials and/or have different indices of refraction. The core 120 is formed of another material, such as $Ta_2O_5$. The bottom cladding 110 is termed "bottom" because in FIG. 3, the bottom cladding 110 resides under the top cladding 130. Thus, the bottom cladding 110 may be closer to a substrate (not shown) than the top cladding 130. However, in other embodiments, the relationship might be reversed. In some embodiments, the cladding is desired to be greater than five hundred nanometers thick.

The grating 100 is used with light 160. The light 160 is characterized by a wavelength, $\lambda$, for which the grating 100 is configured. However, the grating 100 may operate for other wavelengths in a range around $\lambda$. The light 160 may originate in a laser (not shown), for example a laser diode used in an EAMR disk drive. The light 160 is shown by rays 162, 164, and 166. Thus, in the embodiment shown, light from a source (shown as a point in FIG. 3) may traverse the top cladding 130, the top grating 150, the core 120, the bottom gratings 140, and then the bottom cladding. The ray 164 is a central ray and corresponds to an angle of incidence $\alpha 1$ with the grating 100. The angle of incidence $\alpha 1$ may be considered to be the principal angle of incidence for the light 160. The beam of light 160 has a divergence, corresponding to angle $\phi$. Thus, the ray 164 has an angle of incidence of $\alpha 2$ with the grating 100. The ray 166 has an angle of incidence of $\alpha 3$ with the grating 100. Because light may be refracted by the top cladding 130, the angles of incidences of the light 160 differ for the first grating 150 than for the top cladding 130. Thus, the central ray 164 has an angle of incidence $\beta 1$ with the first grating 150. The ray 164 has an angle of incidence of $\beta 2$ with the first grating 150. The ray 166 has an angle of incidence of $\beta 3$ with the first grating 150. Similarly, because light 160 is refracted by the core 120, the angles of incidence at the second grating 140 differ. Thus, the central ray 164 has an angle of incidence $\gamma 1$ with the second grating 140. The ray 164 has an angle of incidence of $\gamma 2$ with the second grating 140. The ray 166 has an angle of incidence of $\gamma 3$ with the second grating 140.

As discussed above, the optical grating 100 is a double grating, including gratings 140 and 150. The gratings 140 and 150 may have different pitches. Use of gratings 140 and 150 may improve the angle tolerance of the optical grating 100. This feature may be understood as follows. The efficiency of a particular grating 140 or 150 in coupling light of a given wavelength depends upon the pitch and the angle of incidence. For a single grating (not shown), the coupling efficiency for a particular pitch and a given wavelength of light may have a peak around a particular angle of incidence. Away from this angle of incidence, the coupling efficiency decreases. For light such as the beam 160, this means that the coupling efficiency for a particular portion, such as the central ray 162 may be optimal. However, because of the divergence $\phi$, the coupling efficiency for a single grating falls off for the remainder of the beam 160. The coupling efficiency for a single grating might be quite low for the beams 164 and 166 having different angles of incidence. In contrast, the gratings 140 and 150 of the optical grating 100 have different pitches. Thus, each grating 140 and 150 may have an idealized coupling efficiency that can be found considering each grating 140 and 150 to be a single grating. These idealized coupling efficiencies of the gratings 140 and 150 are centered around different (optimal) angles of incidence because the pitches are different. In one embodiment, the optimal coupling efficiency for the grating 150 may be 131, while the optical coupling efficiency for the grating 140 may be at the angle of incidence $\gamma 1$. However, in other embodiments, the coupling efficiencies for the gratings 140 and 150 may be centered around different angles of incidence. For example, the coupling efficiency of the grating 150 may be centered around an angle less than $\alpha 1$ or $\beta 1$ and the coupling efficiency of the grating 140 may be centered around an angle greater than $\alpha 1$ or $\gamma 1$, or vice versa. As a result, the total coupling efficiency of the double optical grating 100 may be a combination of the coupling efficiencies of the gratings 140 and 150. As such, the peak coupling efficiency of the double optical grating 100 may have a broader peak centered around an angle of incidence at or near $\alpha 1$. Thus, use of the double optical grating 100 may have a higher coupling efficiency across multiple angles of incidence. As a result, the tolerance for the angle of incidences of the double optical grating 100 may be improved. Stated differently, the double optical grating 100 may be better able to tolerate light, such as the beam 160 having a divergence $\phi$. Consequently, performance of devices using the grating 100, such as an EAMR head, may be improved.

Figure 4:
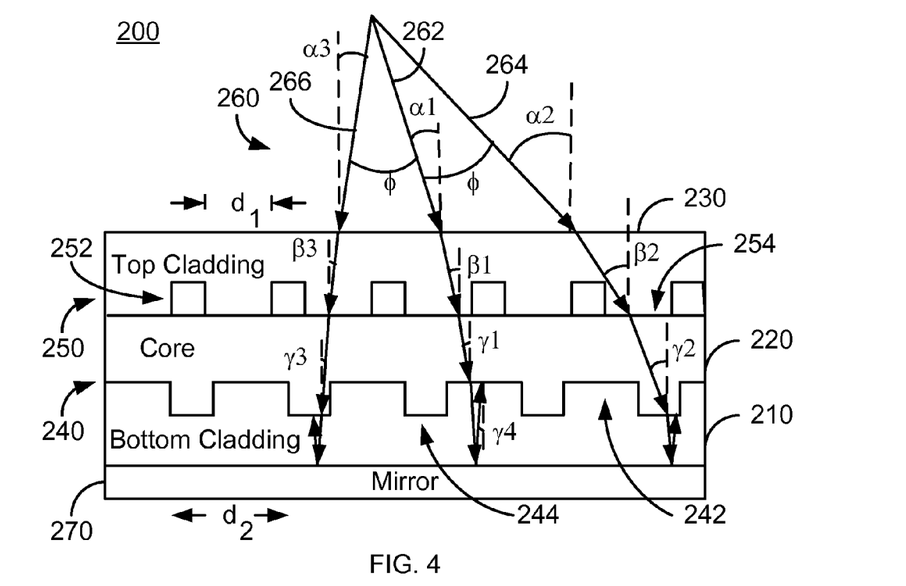
FIG. 4 is a diagram depicting another exemplary embodiment of a double optical grating.

FIG. 4 is a diagram depicting another exemplary embodiment of a double optical grating 200. For simplicity, FIG. 4 is not to scale. The grating 200 is analogous to the grating 100. Consequently, analogous components are labeled similarly. The optical grating 200 thus includes a bottom cladding 210, a core 220, a top cladding 230, a bottom grating 240, and a top grating 250, analogous to the bottom cladding 110, the core 120, the top cladding 130, the bottom grating 140, and the top grating 150, respectively. The light 260 is represented by rays 262, 264, and 266 having angles of incidence $\alpha 1$, $\alpha 2$, and $\alpha 3$, respectively, with respect to the top cladding 230; angles of incidence $\beta 1$, $\beta 2$, and $\beta 3$, respectively, with respect to the core 220; and angles of incidence $\gamma 1$, $\gamma 2$, and $\gamma 3$, respectively, with respect to the bottom cladding 210. The light 260 also has a divergence, $\phi$. The top grating 250 has a pitch $d_1$, while the bottom grating 240 has a pitch $d_2$. In the embodiment shown, the top grating 250 has ridges 252 formed by metal bars, or lines, and troughs 254. The metal bars 252 may be nonmagnetic. The metal bars may also be desired to have reduced optical absorption in the wavelength range used in the grating 200. Further, it may be desirable for the metal bars 252 to be unlikely to oxidize. For example, the ridges 252 may be Au and/or Cu lines. The duty cycle is also desired to be low. Thus the metal bars 242 are thinner, making it more probable that the light 260 may be coupled into the grating 200. Also note that in the embodiment shown, the ridges 252 appear on top of the flat top surface of the core 220. However, in another embodiment, the ridges 262 may reside in depressions in the top surface of the core 220. The top grating 250 resides between a portion of the top cladding 230 and the top of the core 220. Thus, the top grating 250 is at the interface between the core 220 and the top cladding 230. The bottom grating 240 has ridges 242 interleaved with troughs 244 and is formed at the interface between the bottom cladding 210 and the core 220. Thus, the bottom grating 240 resides between a portion of the bottom cladding 210 and the core 220.

The grating 200 also includes a mirror 270. The bottom cladding 210 resides between the mirror 270 and the core 220. The mirror 270 may be used to improve the efficiency of the grating 200 by recirculating, or recycling, the light 260. More specifically, as shown in FIG. 4, the rays 262, 264, and 266 traverse the core 220 and bottom cladding 210, reflect off of the mirror 270, and return to the core 220. For example, the ray 262 enters the optical grating 200 at angle of incidence α1, traverses the top cladding 230 and grating 250, enters the core 220 at angle of incidence β1, traverses the core 220, enters the bottom grating 220 with angle of incidence γ1, crosses the bottom cladding 210, reflects off of the mirror 270, and returns to the bottom grating 220 with reflected angle of incidence γ4. Thus, energy from the ray 262 has another opportunity to be coupled into the device via the bottom grating 240. Similarly, the energy from rays 264 and 266 has an additional opportunity to be coupled into the device. In the embodiment shown, the all of the light 260 reflects back into the bottom grating 240. However, in other embodiments, not all of the light 260 may be recirculated back to the bottom grating 240.

The thickness of the bottom cladding 210 may be configured such that recycled light returns to a portion of the bottom grating 240 in an optimal manner. In other words, the thickness may allow for more light to be recycled back to the bottom grating 240 and, in at least some embodiments, to the top grating 250. In addition, if one or more of the gratings 240 and 250 has a nonlinear pitch, recycled light having a larger reflected angle of incidence is incident on the bottom grating 240 where the pitch is larger. Thus coupling efficiency of the grating 200 may be further improved.

Figure 5:
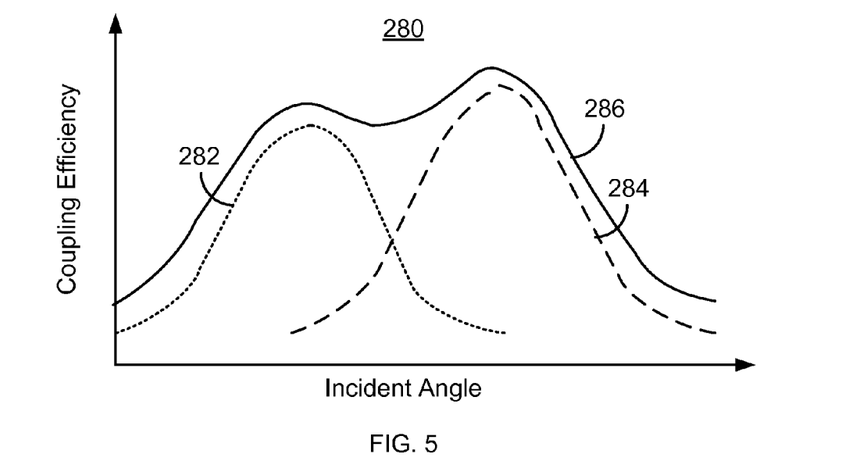
FIG. 5 is a diagram depicting the relationship between the efficiency curves of the gratings and the efficiency curve of a double optical grating.

The coupling efficiency of the grating 200 may be determined in an analogous manner to the optical grating 100, described above. For example, FIG. 5 is a graph 280 depicting the relationship between the idealized efficiency curves 282 and 284 of the gratings 240 and 250, respectively and the idealized efficiency curve 286 for optical coupling by the double optical grating 200. FIG. 5 is thus described in connection with the grating 200. However, note that the curves 282, 284, and 286 of FIG. 5 are for explanatory purposes only, and not intended to correspond to data for a particular grating. For clarity, the idealized efficiency curve 286 of the double optical grating 200 is offset from the curves 282 and 284. As can be seen in FIG. 5, each of the idealized efficiency curves 282 and 284 has a single peak centered around a particular optimal angle of incidence for the grating 240 and 250, respectively. Thus, in some embodiments, the idealized efficiency curves 282 and 284 correspond to the gratings 240 and 250, respectively, if the gratings 240 and 250 were single gratings. In the embodiment shown, the idealized efficiency curves 282 and 284 overlap. However, in other embodiments of the double optical grating 200, the curves 282 and 284 need not overlap or may overlap to a different extent. The idealized efficiency curve 286 for the double optical grating 200 is a combination of the idealized efficiency curves 282 and 284. In some embodiments, the idealized efficiency curve 286 is the sum of the idealized efficiency curves 282 and 284. However, in general, the peaks in the curve 286 are smaller in height then the peaks for the curves 282 and 284. Thus, the idealized efficiency curve 286 of the double grating corresponds to, but is generally not equal the sum of the curves 282 and 284. Because two gratings 240 and 250 are included in the double optical grating 200, the idealized efficiency curve 286 has a broad peak having two local maxima near the peaks for the curves 282 and 284. As can be seen by the breadth of the curve 286, the angle tolerance for the optical grating 200 may be improved over a single grating. Further, in some embodiments, the optimal angle of incidence for the gratings 240 and 250 are less than and greater than, respectively, the principal angle of incidence, φ1, or vice versa. Thus, the broad efficiency curve 286 may be substantially centered on the desired angle of incidence for the beam 260 of light with which the grating 200 is desired to be used.

Figure 6:
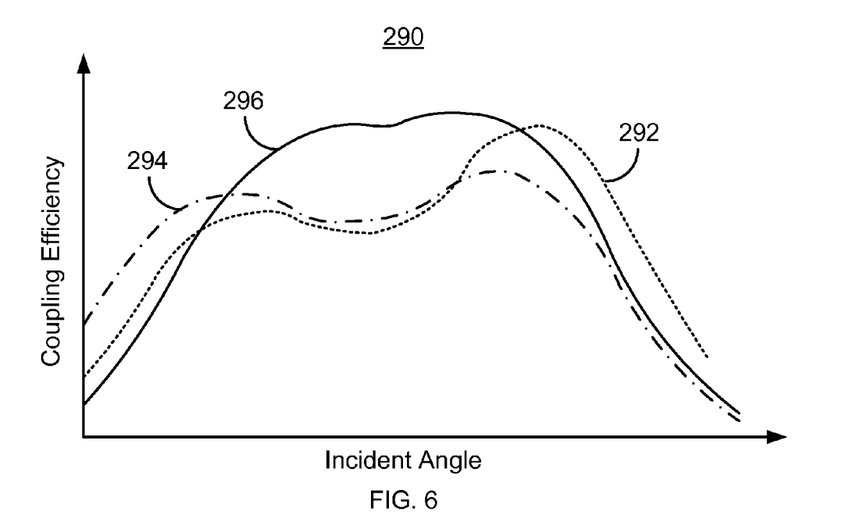
FIG. 6 is another diagram depicting the relationship between the efficiency curves of the gratings and the efficiency curve of a double optical grating.

FIG. 6 is another diagram 290 depicting the relationship between the efficiency curves of the gratings and the efficiency curve of a double optical grating such as the double optical grating 200. FIG. 6 is thus described in connection with the grating 200. However, note that the curves 292, 294, and 296 of FIG. 6 are for explanatory purposes only, and not intended to correspond to data for a particular grating. The curves 292, 294, and 296 correspond to an optical grating 200 in which the gratings 240 and 250 have different pitches. Thus, the idealized efficiency curves of the gratings 240 and 250 would overlap to different extents. The idealized efficiency curves 292 and 294 for the total grating 200 are wider because the idealized efficiency curves of the individual gratings 240 and 250 overlap less. However, there is a local minimum in each of the curves 292 and 294 that is noticeably less than the local (and global) maxima. Further, the curves 292 and 294 are less symmetric than the curve 296. For example, the peaks at higher angles of incidence have a noticeably greater coupling efficiency than the peak at the lower angles of incidence. In contrast, the peaks for the curve 296 are closer in total maximum efficiency and have a minimum that is closer to the local (and global) maxima. Thus, in some embodiments, the pitches of the gratings 240 and 250 would be selected to provide an idealized coupling efficiency for the grating 200 close to or substantially the same as that shown in the curve 296. Stated differently, the pitches of the gratings 240 and 250 may be selected such that the idealized optical efficiency curve of the grating 200 has a substantially flat central peak and is substantially symmetric.

Thus, by selecting the pitches of the gratings 240 and 250, the angle tolerance of the double grating 200 may be improved. Further, use of a mirror 270 to recirculate light may improve the efficiency of the double optical grating 200. Thus, performance of a device, such as an EAMR head, employing the double optical grating 200 may be improved.

Figure 7:
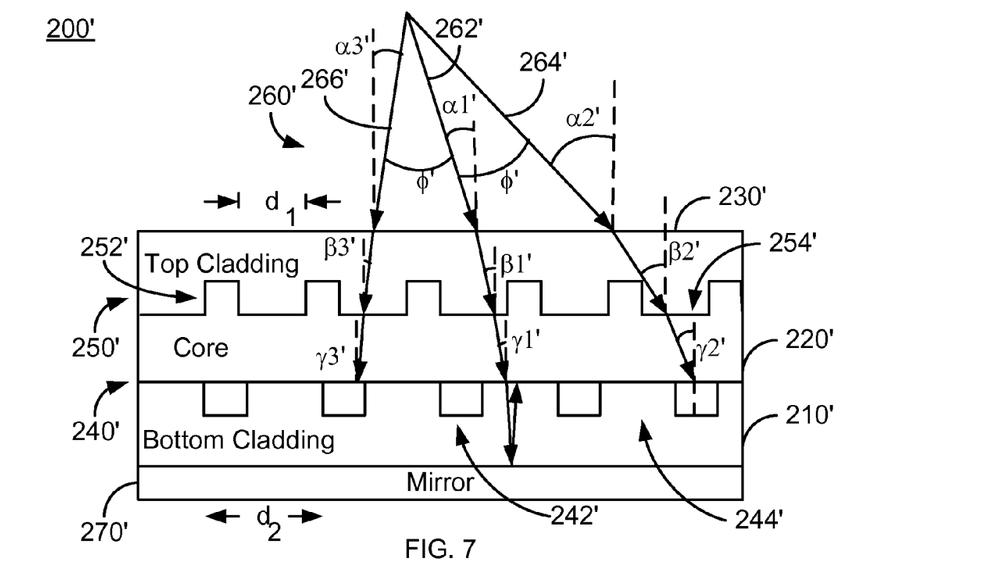
FIG. 7 is a diagram depicting another exemplary embodiment of a double optical grating.

FIG. 7 is a diagram depicting another exemplary embodiment of a double optical grating 200'. For simplicity, FIG. 7 is not to scale. The grating 200' is analogous to the gratings 100 and 200. Consequently, analogous components are labeled similarly. The optical grating 200' thus includes a bottom cladding 210', a core 220', a top cladding 230', a bottom grating 240', a top grating 250', and a mirror 270' analogous to the bottom cladding 110/210, the core 120/220, the top cladding 130/230, the bottom grating 140/240, the top grating 150/250, and the mirror 270, respectively. The light 260' is represented by rays 262', 264', and 266' having angles of incidence α1', α2', and α3', respectively, with respect to the top cladding 230'; angles of incidence β1', β2', and β3', respectively, with respect to top grating 250'; and angles of incidence γ1', γ2', and γ3', respectively, with respect to the bottom grating 240'. The light 260' also has a divergence, φ". The top grating 250' has a pitch $d_1$, while the bottom grating 240' has a pitch $d_2$. The top grating 250' has ridges 252' interleaved with troughs 254' and is formed at the interface between the top cladding 230' and the core 220'. In the embodiment shown, the bottom grating 240' has ridges 242' formed by nonmagnetic metal bars, or lines, and troughs 244'. Note that in this embodiment, the ridges 242' are ridges into the bottom cladding 210'. The metal bars 242' may be nonmagnetic. The metal bars may also be desired to have reduced optical absorption in the wavelength range used in the grating 200'. Further, it may be desirable for the metal bars 242' to be unlikely to oxidize. For example, the ridges 242' may be Au and/or Cu lines. The duty cycle is also desired to be low. Thus the metal bars 242' are thinner, making it more probable that the light 260' may be coupled into the grating 200'. The bottom grating 240' resides between a portion of the bottom cladding 240' and the bottom of the core 220'. Thus, the bottom grating 240' resides at the interface between the bottom cladding 210' and the core 220'. The mirror 270' may be used to improve the efficiency of the grating 200' by recirculating, or recycling, the light 260'. In the embodiment shown, not all of the light 260' reflects back into the bottom grating 240'. However, in other embodiments, all of the light 260' may be recirculated back to the bottom grating 240'. As described above, the thickness of the bottom cladding 210' may be configured such that recycled light returns to a portion of the bottom grating 240' in an optimal manner.

Like the optical gratings 100 and 200, the optical grating 200' is a double grating in which the gratings 240' and 250' may have different pitches. Thus, as described above for the gratings 100 and 200, the angle tolerance of the grating 200' may be improved. The pitches of the gratings 240' and 250' may also be selected such that the efficiency curve of the grating 200' has a substantially flat, broad central peak, and is substantially symmetric. The presence of the mirror 270' allows light to be recycled. Thus, optical efficiency may be improved. The thickness of the bottom cladding 210' may also be set to improve recycling of the light. Optical efficiency of the grating 200' may be further improved. Consequently, performance of the grating 200' may be improved. As a result, the grating 200' may improve the performance and efficiency of the device in which the grating 200' is used.

Figure 8:
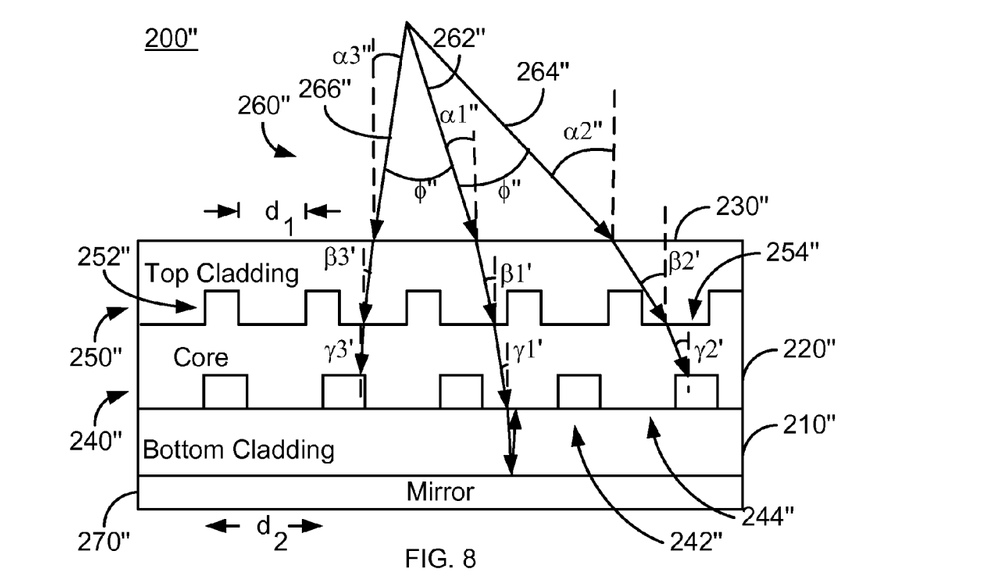
FIG. 8 is a diagram depicting another exemplary embodiment of a double optical grating.

FIG. 8 is a diagram depicting another exemplary embodiment of a double optical grating 200". For simplicity, FIG. 8 is not to scale. The grating 200" is analogous to the gratings 100, 200, and 200'. Consequently, analogous components are labeled similarly. The optical grating 200" thus includes a bottom cladding 210", a core 220", a top cladding 230", a bottom grating 240", a top grating 250", and a mirror 270" analogous to the bottom cladding 110/210/210', the core 120/220/220', the top cladding 130/230/230', the bottom grating 140/240/240', the top grating 150/250/250', and the mirror 270/270', respectively. The light 260" is represented by rays 262", 264", and 266" having angles of incidence $\alpha 1"$, $\alpha 2"$, and $\alpha 3"$, respectively, with respect to the top cladding 230"; angles of incidence $\beta 1"$, $\beta 2"$, and $\beta 3"$, respectively, with respect to the top grating 250"; and angles of incidence $\gamma 1"$, $\gamma 2"$, and $\gamma 3"$, respectively, with respect to the bottom grating 240". The light 260" also has a divergence, $\phi"$. The top grating 250" has a pitch $d_1$, while the bottom grating 240" has a pitch $d_2$. The top grating 250" has ridges 252" interleaved with troughs 254" and is formed at the interface between the top cladding 230" and the core 220". In the embodiment shown, the bottom grating 240" has ridges 242" formed by nonmagnetic metal bars, or lines, and troughs 244". Note that in this embodiment, the ridges 242" are on a flat top surface of the bottom cladding 210". The metal bars 242" may be nonmagnetic. The metal bars may also be desired to have reduced optical absorption in the wavelength range used in the grating 200". Further, it may be desirable for the metal bars 242" to be unlikely to oxidize. For example, the ridges 242" may be Au and/or Cu lines. The duty cycle is also desired to be low. Thus the metal bars 242" are thinner, making it more probable that the light 260" may be coupled into the grating 200". The bottom grating 240" resides between a portion of the bottom cladding 240" and the bottom of the core 220". Thus, the bottom grating 240" resides at the interface between the bottom cladding 210" and the core 220". The mirror 270" may be used to improve the efficiency of the grating 200" by recirculating, or recycling, the light 260". In the embodiment shown, the not all of the light 260" reflects back into the bottom grating 240". However, in other embodiments, all of the light 260" may be recirculated back to the bottom grating 240". As described above, the thickness of the bottom cladding 210" may be configured such that recycled light returns to a portion of the bottom grating 240" in an optimal manner.

Like the optical gratings 100, 200, and 200', the optical grating 200" is a double grating in which the gratings 240" and 250" may have different pitches. Thus, as described above for the gratings 100, 200, and 200' the angle tolerance of the grating 200" may be improved. The pitches of the gratings 240" and 250" may also be selected such that the efficiency curve of the grating 200" has a substantially flat, broad central peak, and is substantially symmetric. The presence of the mirror 270" allows light to be recycled. Thus, optical efficiency may be improved. The thickness of the bottom cladding 210" may also be set to improve recycling of the light. Optical efficiency of the grating 200" may be further improved. Consequently, performance of the grating 200" may be improved. As a result, the grating 200" may improve the performance and efficiency of the device in which the grating 200" is used.

Figure 9:
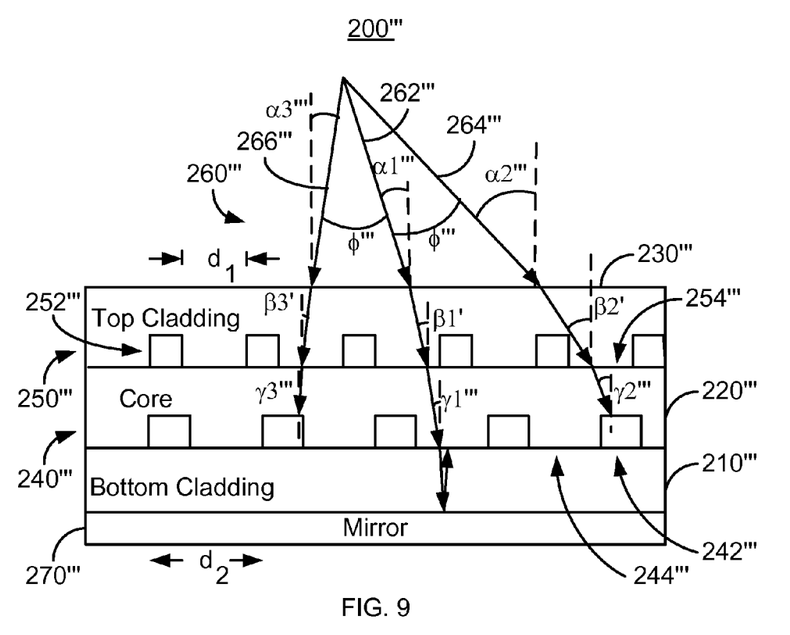
FIG. 9 is a diagram depicting another exemplary embodiment of a double optical grating.

FIG. 9 is a diagram depicting another exemplary embodiment of a double optical grating 200'''. For simplicity, FIG. 9 is not to scale. The grating 200''' is analogous to the gratings 100, 200, 200', and 200". Consequently, analogous components are labeled similarly. The optical grating 200''' thus includes a bottom cladding 210''', a core 220''', a top cladding 230''', a bottom grating 240''', a top grating 250''', and a mirror 270''' analogous to the bottom cladding 110/210/210'/210", the core 120/220/220'/220", the top cladding 130/230/230'/230", the bottom grating 140/240/240'/240", the top grating 150/250/250'/250", and the mirror 270/270'/270", respectively. The light 260''' is represented by rays 262''', 264''', and 266''' having angles of incidence $\alpha 1'''$, $\alpha 2'''$, and $\alpha 3'''$, respectively, with respect to the top cladding 230'''; angles of incidence $\beta 1'''$, $\beta 2'''$, and $\beta 3'''$, respectively, with respect to the top grating 250'''; and angles of incidence $\gamma 1'''$, $\gamma 2'''$, and $\gamma 3'''$, respectively, with respect to the bottom grating 240'''. The light 260''' also has a divergence, $\phi'''$. The top grating 250''' has a pitch $d_1$, while the bottom grating 240''' has a pitch $d_2$. The top grating 250''' has ridges 252''' interleaved with troughs 254''' and is formed at the interface between the top cladding 230''' and the core 220'''. The bottom grating 240''' has ridges 242''' interleaved with troughs 244''' and is formed at the interface between the bottom cladding 210''' and the core 220'''. In the embodiment shown, the ridges 242''' and 252''' are both formed by nonmagnetic metal bars, or lines, separated by troughs 244''' and 254''', respectively. Note that in this embodiment, the ridges 242''' and 252''' are on a flat top surface of the bottom cladding 210''' and core 220''', respectively. However, in other embodiments, the ridges 242''' and/or 252''' may be formed in depressions in the underlying layers 210''' and 220''', respectively. The metal bars 242''' and 252''' may be nonmagnetic. The metal bars 242''' and 252''' may also be desired to have reduced optical absorption in the wavelength range used in the grating 200'''. Further, it may be desirable for the metal bars 242''' and 252''' to be unlikely to oxidize. For example, the ridges 242''' and 252''' may be Au and/or Cu lines. The duty cycle is also desired to be low. Thus the metal bars 242''' and 252''' are thinner, making it more probable that the light 260''' may be coupled into the grating 200'''. The mirror 270''' may be used to improve the efficiency of the grating 200''' by recirculating, or recycling, the light 260'''. In the embodiment shown, the not all of the light 260''' reflects back into the bottom grating 240'''. However, in other embodiments, all of the light 260''' may be recirculated back to the bottom grating 240'''. As described above, the thickness of the bottom cladding 210''' may be configured such that recycled light returns to a portion of the bottom grating 240''' in an optimal manner.

Like the optical gratings 100, 200, 200', and 200'', the optical grating 200''' is a double grating in which the gratings 240''' and 250''' may have different pitches. Thus, as described above for the gratings 100, 200, 200', and 200'' the angle tolerance of the grating 200''' may be improved. The pitches of the gratings 240''' and 250''' may also be selected such that the efficiency curve of the grating 200''' has a substantially flat, broad central peak, and is substantially symmetric. The presence of the mirror 270''' allows light to be recycled. Thus, optical efficiency may be improved. The thickness of the bottom cladding 210''' may also be set to improve recycling of the light. Optical efficiency of the grating 200''' may be further improved. Consequently, performance of the grating 200''' may be improved. As a result, the grating 200''' may improve the performance and efficiency of the device in which the grating 200''' is used. Finally, note that although specific features have been shown in each of the gratings 200, 200', 200'', and 200''', portions of any number of the gratings 200, 200', 200'', and 200''' may be combined.

Figure 10:
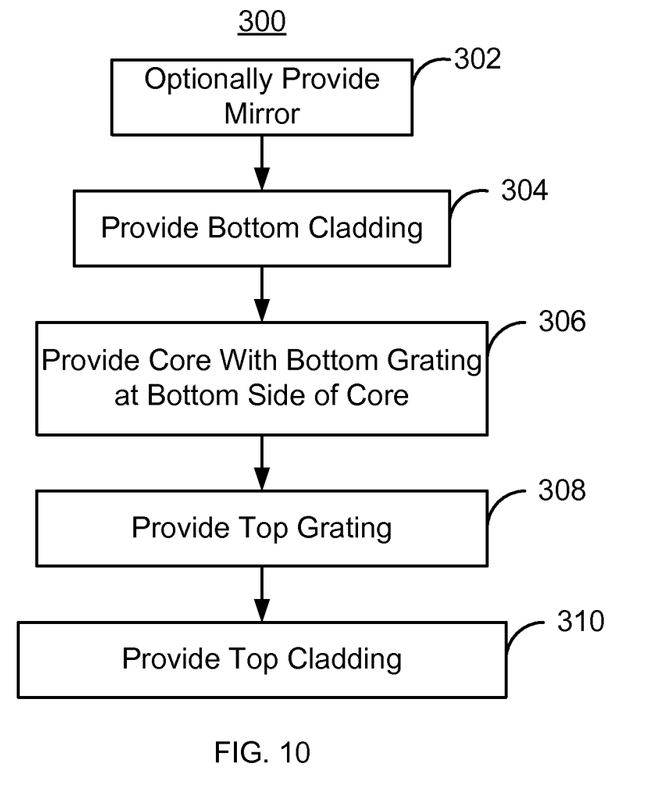
FIG. 10 is a flow chart depicting an exemplary embodiment of a method for fabricating a grating.

FIG. 10 is a flow chart depicting an exemplary embodiment of a method 300 for fabricating a grating. Although certain steps are shown, some steps may be omitted, interleaved, and/or combined. The grating being fabricated may be used in an optical system such as EAMR head that resides on a slider (not shown) in a disk drive. Thus, the method 300 may be part of a method used in fabricating an EAMR head. The method 300 also may commence after formation of other portions of the EAMR head. The method 300 is also described in the context of providing one double optical grating. However, the method 300 may be used to fabricate multiple double optical gratings at substantially the same time. The method 300 is also described in the context of particular layers. However, in some embodiments, such layers may include multiple sub-layers. The grating fabricated using the method 300 is configured for a particular wavelength. Thus, the grating operates for light in a range around the wavelength. For example, in one embodiment, the grating being fabricated is configured for 830 nm light. In other embodiments, the wavelength may differ. For example, gratings for wavelengths of nine hundred nanometers or more might be fabricated. The method 300 is also described in the context of the grating 200. However, the method 300 may be used for fabricating other components.

The mirror 270 may optionally be provided, via step 302. Step 302 may include depositing a reflective material, such as a metal, and/or planarizing the surface. The bottom cladding 210 may be provided on the mirror 270, via step 304. Step 304 may include depositing a layer of aluminum oxide or other optically transparent material. Further, step 304 may also include setting the thickness of the bottom cladding 210 to improve the efficiency of the recycled light.

The core 220 is provided, via step 306. Thus, the bottom grating may also be provided in step 306. For example, step 306 may include removing portions of the bottom cladding 210 and depositing the core material(s), such as $Ta_2O_5$ or other optically transparent material. Step 306 may be carried out such that the bottom grating 240 has a nonlinear pitch.

The top grating 250 is provided, via step 308. Step 308 may include providing a mask on the top of the core 220, depositing a metal layer, then removing the mask. Thus, the metal bars 252 remain. In other embodiments, step 308 might include blanket depositing a layer of metal on the core 220, then removing portions of the metal layer such that metal bars 252 remain. Such a process may be performed by providing a mask on the metal layer and removing exposed portions of the metal layer. In other embodiments, depressions corresponding to the metal bars 252 may be formed in the core 220, and the metal layer deposited. In some embodiments, portions of the metal outside of the depression may also be removed. Step 308 may be carried out such that the top grating 250 has a nonlinear pitch. The top cladding 230 may then be provided, via step 310.

Using the method 300, the optical gratings 100 and/or 200 may be fabricated. Further, steps 306 and 308 may be performed such that the optical efficiency curve is symmetric, a substantially flat central peak, and/or corresponds to the idealized optical efficiency curves of the gratings 140/240 and 150/250 overlapping. Consequently, the benefits of the optical gratings 100 and/or 200 may be obtained.

Figure 11:
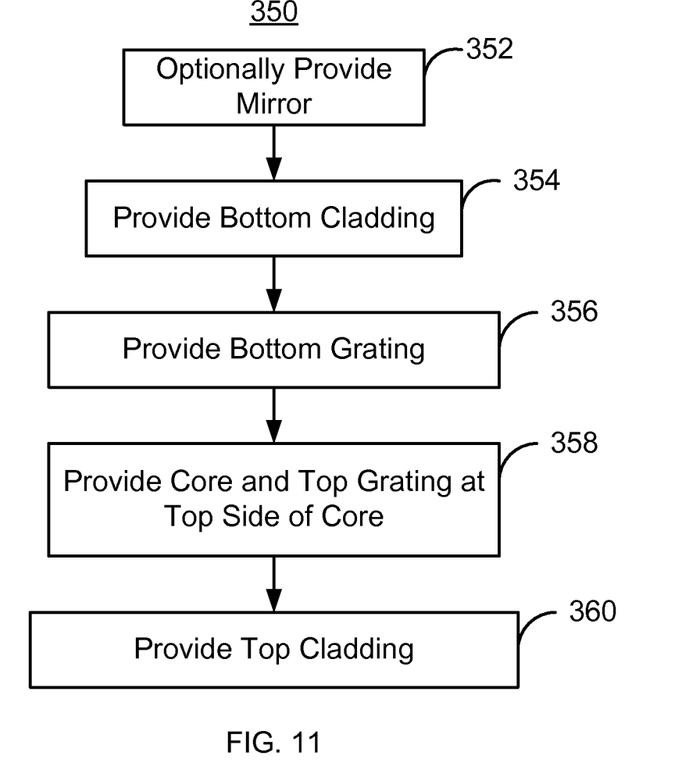
FIG. 11 is a flow chart depicting another exemplary embodiment of a method for fabricating a grating.

FIG. 11 is a flow chart depicting another exemplary embodiment of a method 350 for fabricating a grating. Although certain steps are shown, some steps may be omitted, interleaved, and/or combined. The grating being fabricated may be used in an optical system such as EAMR head that resides on a slider (not shown) in a disk drive. Thus, the method 350 may be part of a method used in fabricating an EAMR head. The method 350 also may commence after formation of other portions of the EAMR head. The method 350 is also described in the context of providing one double optical grating. However, the method 350 may be used to fabricate multiple double optical gratings at substantially the same time. The method 350 is also described in the context of particular layers. However, in some embodiments, such layers may include multiple sub-layers. The grating fabricated using the method 350 is configured for a particular wavelength. Thus, the grating operates for light in a range around the wavelength. For example, in one embodiment, the grating being fabricated is configured for 830 nm light. In other embodiments, the wavelength may differ. For example, gratings for wavelengths of nine hundred nanometers or more might be fabricated. The method 350 is also described in the context of the gratings 200'/200''/200'''. However, the method 350 may be used for fabricating other components.

The mirror 270'/270''/270''' may optionally be provided, via step 352. Step 352 may include depositing a reflective material, such as a metal, and/or planarizing the surface. The bottom cladding 210'/210''/210''' may be provided on the mirror 270/270''/270''', via step 304. Step 304 may include depositing a layer of aluminum oxide or other optically transparent material. Further, step 354 may also include setting the thickness of the bottom cladding 210'/210''/210''' to improve the efficiency of the recycled light.

The bottom grating 240'/240''/240''' is provided, via step 356. Step 356 may include providing a mask on the top of the bottom cladding 210'/210''/210''', depositing a metal layer, and then removing the mask. Thus, the metal bars 242'/242''/242''' remain. In other embodiments, step 356 might include blanket depositing a layer of metal on the bottom cladding 210'/210''/210''', then removing portions of the metal layer such that metal bars 252 remain. Such a process may be performed by providing a mask on the metal layer and removing exposed portions of the metal layer. in other embodiments, depressions corresponding to the metal bars 242'/242"/242'" may be formed in the bottom cladding 210'/210"/210'", and the metal layer deposited. In some embodiments, portions of the metal outside of the depression may also be removed. Step 356 may be carried out such that the bottom grating 240'/240"/240'" has a nonlinear pitch.

The core 220'/220"/220'" is provided, via step 358. The top grating 250/250"/250'" may also be provided in step 358. Step 358 may include depositing the core material(s), such as Ta$_2$O$_5$ or other optically transparent material. Step 358 may also include removing portions of the core 220'/220"/220'" to form grating 250'. In other embodiments, step 358 may be used to provide metal bars 252". Step 358 may include providing a mask on the top of the core 220'", depositing a metal layer, and then removing the mask. Thus, the metal bars 252'" remain. In other embodiments, step 308 might include blanket depositing a layer of metal on the core 220'", then removing portions of the metal layer such that metal bars 252'" remain. Such a process may be performed by providing a mask on the metal layer and removing exposed portions of the metal layer. In other embodiments, depressions corresponding to the metal bars 252'" may be formed in the core 220'", and the metal layer deposited. In some embodiments, portions of the metal outside of the depression may also be removed. Step 358 may be carried out such that the top grating 250'/250"/250'" has a nonlinear pitch. The top cladding 230'/230"/230'" may then be provided, via step 360.

Using the method 350, the optical gratings 100, 200', 200", and/or 200'" may be fabricated. Further, steps 356 and 358 may be performed such that the optical efficiency curve is symmetric, a substantially flat central peak, and/or corresponds to the idealized optical efficiency curves of the gratings 140/240'/240"/240'" and 150/250'/250"/250'" overlapping. Consequently, the benefits of the optical gratings 100, 200', 200", and/or 200'" may be obtained. Thus, using the method 300 and/or 350, the optical gratings 100, 200, 200', 200", 200'" or some combination thereof may be obtained. Consequently, the device using such optical gratings 100, 200, 200', 200", 200'" may be improved.

We claim:

1. An optical grating configured for light of a wavelength, the optical grating comprising:
   a top cladding;
   a first plurality of discrete ridges spaced apart by a first pitch forming a first grating, the first grating having a first idealized efficiency curve corresponding to the first pitch;
   a core having a top side and a bottom side, top side of the core being adjacent to at least a portion of the top cladding, the first grating residing between the top cladding and the core;
   a second plurality of discrete ridges spaced apart by a second pitch and forming a second grating, the second grating having a second idealized efficiency curve corresponding to the second pitch, the first grating and the second grating being configured such that the optical grating has an idealized efficiency curve corresponding to the sum of the first idealized efficiency curve and the second idealized efficiency curve and such that the idealized efficiency curve has a substantially flat central peak; and
   a bottom cladding adjacent to at least a portion of the bottom side of the core, the second grating residing between the bottom cladding and the core.

2. The optical grating of claim 1 wherein the first pitch is different from the second pitch.

3. The optical grating of claim 1 wherein the light traverses the top cladding before the core and has a first plurality of angles of incidence with the first grating and a second plurality of angles of incidence with the second grating.

4. The optical grating of claim 3 wherein the first plurality of angles of incidence and the second plurality of angles of incidence correspond to a primary nominal angle of incidence and a beam divergence for the light.

5. The optical grating of claim 1 further comprising:
   a mirror, the bottom cladding residing between the core and the mirror.

6. The optical grating of claim 5 wherein the bottom cladding has a thickness configured to recirculate the light reflecting off of the mirror to be returned to a portion of the core.

7. The optical grating of claim 1 wherein the first grating further includes a plurality nonmagnetic metal bars.

8. The optical grating of claim 1 wherein the second grating further includes a plurality nonmagnetic metal bars.

9. The optical grating of claim 1 wherein the first plurality of ridges are formed in the top side of the core such that the first grating is formed between the top cladding and the top side of the core.

10. The optical grating of claim 1 wherein the second plurality of ridges are formed in the bottom cladding such that the second grating is formed between the bottom cladding and the bottom side of the core.

11. The optical grating of claim 1 wherein the idealized efficiency curve is substantially symmetric.

12. An optical grating comprising:
   a top cladding;
   a first grating including a plurality of discrete metallic bars spaced apart by a first pitch, the first pitch corresponding to a first idealized efficiency curve;
   a core having a top side and a bottom side, the bottom side including a plurality of discrete ridges spaced apart by a second pitch different from the first pitch and forming a second grating, the second pitch corresponding to a second idealized efficiency curve, top side being adjacent to the top cladding, the first grating residing between a portion of the top cladding and the top side of the core;
   a bottom cladding adjacent to the bottom side of the core, the core residing between the bottom cladding and the top cladding; and
   a mirror, the bottom cladding residing between the core and the mirror;
   wherein the optical grating has an idealized efficiency curve corresponding to the sum of the first idealized efficiency curve and the second idealized efficiency curve, the idealized efficiency curve being substantially symmetric and having a substantially flat central peak.

13. An optical grating comprising:
   a top cladding;
   a core having a top side and a bottom side, the top side including a plurality of discrete ridges spaced apart by a first pitch and forming a first grating, the first pitch corresponding to a first idealized efficiency curve, top side being adjacent to the top cladding;
   a second grating including a plurality of discrete metallic bars spaced apart by a second pitch different from the first pitch, the second pitch corresponding to a second idealized efficiency curve;
   a bottom cladding adjacent to the bottom side of the core, the second grating residing between a portion of the bottom cladding and the bottom side of the core; and a mirror, the bottom cladding residing between the core and the mirror;

wherein the optical grating has an idealized efficiency curve corresponding to the sum of the first idealized efficiency curve and the second idealized efficiency curve, the idealized efficiency curve being substantially symmetric and having a substantially flat central peak.

14. A method for providing an optical grating configured for light of a wavelength, the method comprising:

providing a bottom cladding;

providing a core having a top side and a bottom side, the bottom side including first plurality of discrete ridges spaced apart by a first pitch and forming a bottom grating, the first pitch corresponding to a first idealized efficiency curve;

providing a top grating including a second plurality of discrete ridges spaced apart by a second pitch on the top side of the core, the second grating having a second idealized efficiency curve corresponding to the second pitch, the first grating and the second grating being configured such that the optical grating has an idealized efficiency curve corresponding to the sum of the first idealized efficiency curve and the second idealized efficiency curve and such that the idealized efficiency curve has a substantially flat central peak; and providing a top cladding, the core residing between the bottom cladding and the top cladding, the top grating residing between a portion of the top cladding and the top side of the core.

15. The method of claim 14 wherein the first pitch is different from the second pitch.

16. The method of claim 15 further comprising:

providing a mirror, the bottom cladding residing between the core and the mirror.

17. The method of claim 14 wherein the step of providing the top grating further includes:

providing a plurality nonmagnetic metal bars.

18. The method of claim 14 wherein the idealized efficiency curve is substantially symmetric.

19. The method of claim 14 wherein the step of providing the bottom cladding further includes:

removing a portion of the bottom cladding to form the first plurality of discrete ridges.

20. A method for providing an optical grating configured for light of a wavelength, the method comprising:

providing a bottom cladding;

providing a bottom grating including a first plurality of discrete ridges spaced apart by a first pitch on the bottom cladding, the first pitch corresponding to a first idealized efficiency curve;

providing a core having a top side and a bottom side, the top side including second plurality of discrete ridges spaced apart by a second pitch and forming a top grating, the to grating having a second idealized efficiency curve corresponding to the second pitch, the bottom grating and the top grating being configured such that the optical grating has an idealized efficiency curve corresponding to the sum of the first idealized efficiency curve and the second idealized efficiency curve and such that the idealized efficiency curve has a substantially flat central peak;

providing a top cladding, the core residing between the bottom cladding and the top cladding.

21. The method of claim 20 further comprising:

providing a mirror, the bottom cladding residing between the core and the mirror.

22. The method of claim 20 wherein the step of providing the bottom grating further includes:

providing a plurality nonmagnetic metal bars.

23. The method of claim 20 wherein the step of providing the core further includes:

removing a portion of the core to form the second plurality of discrete ridges.

\* \* \* \* \*